(No Model.) 2 Sheets—Sheet 1.
C. H. SEWALL.
Underground Telegraph.
No. 240,776. Patented April 26, 1881.
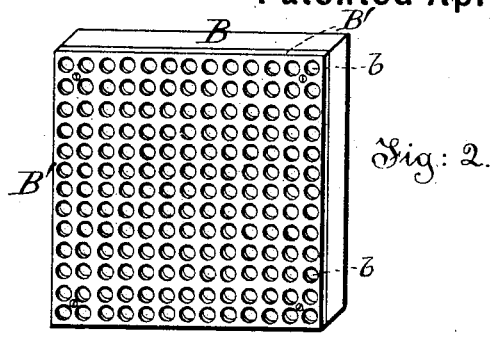
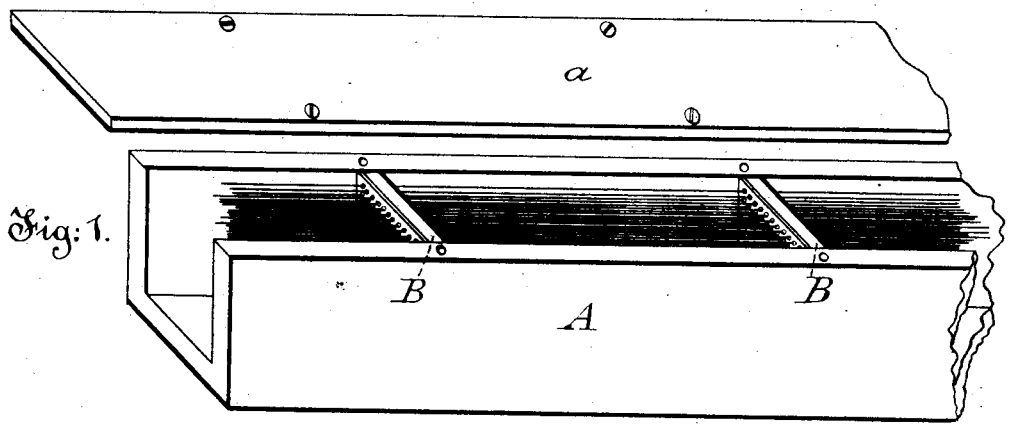
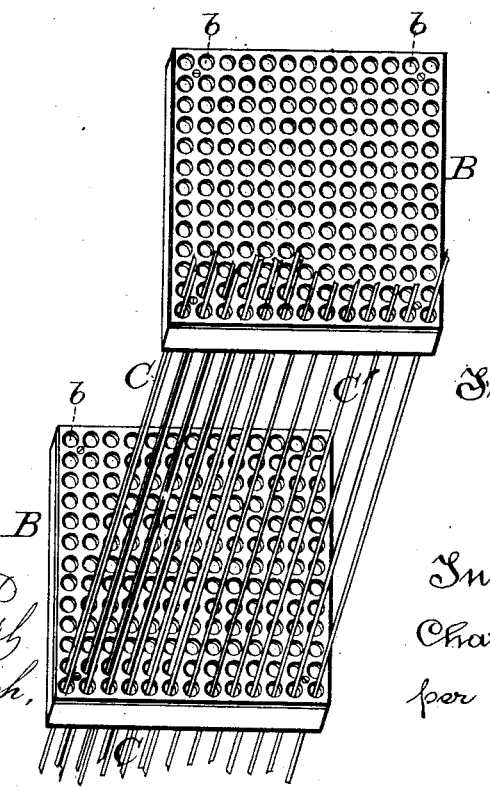
Witnesses:
Inventor.
Charles H. Sewall,
per Frank L. Pope
Attorney.

(No Model.)  2 Sheets—Sheet 2.
C. H. SEWALL.
Underground Telegraph.
No. 240,776.  Patented April 26, 1881.
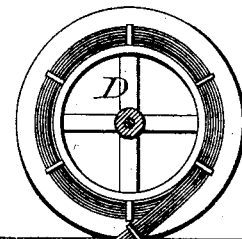
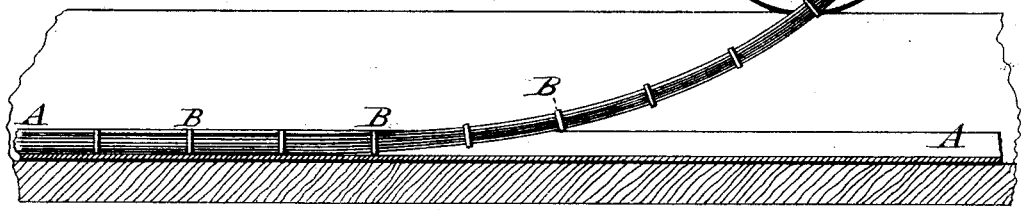
Fig. 4.
Fig. 5.
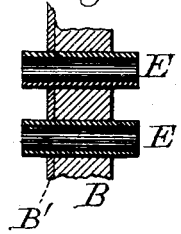
Fig. 6.
Witnesses;
Miller C. Earl
Mrs. K. Lockwood French.
Inventor;
Charles H. Sewall.
per Frank L. Pope
Attorney.

UNITED STATES PATENT OFFICE.

CHARLES H. SEWALL, OF ALBANY, NEW YORK.

UNDERGROUND TELEGRAPH.

SPECIFICATION forming part of Letters Patent No. 240,776, dated April 26, 1881.

Application filed September 28, 1880. (No model.)

*To all whom it may concern:*

Be it known that I, CHARLES H. SEWALL, a citizen of the United States, residing at Albany, in the county of Albany and State of New York, have invented certain new and useful Improvements in Underground Telegraphs; and I do hereby declare the following to be a full, clear, and exact description thereof, reference being had to the accompanying drawings.

My invention relates to that class of underground telegraphs which consists of a series of insulated conductors arranged in a group in a hollow trunk, trough, or conduit, which is placed beneath the surface of the earth.

My improvement consists, first, in an improved process or method of preparing and laying the conductors by threading the conductors through perforated partitions or supports placed transversely thereto at intervals, securing the said supports to the conductors, and then depositing the group of conductors and their supports within a trunk or conduit at a single operation; second, in the combination of a trunk or conduit, having within it a group of insulated electric conductors, with transverse conducting-supports placed within said conduit at suitable intervals.

In the accompanping drawings, Figure 1 is a perspective view of a trough or conduit with the cover removed, so as to show the arrangement of the wires. Fig. 2 is a perspective view of one of the transverse wire-supports of said conduit. Fig. 3 is a perspective view, showing the manner in which the wires are prepared for laying. Fig. 4 is a diagram illustrating the manner of laying the wires in the conduit. Fig. 5 shows the manner in which the wires are laid in pairs and arranged to counteract the effects of induction, and Fig. 6 is a modification in the manner of constructing the supports.

The general principle of my invention will be best understood by reference to Fig. 1, in which A represents a hollow trunk, trough, or conduit with a removable top or cover, *a*. This conduit may extend longitudinally any distance to which the electrical-conductors are required to be carried, and its dimensions will in like manner be determined by the number of conductors for which accommodations are to be provided. The conduit A is preferably constructed of wood, saturated with some suitable preservative compound—such, for instance, as petroleum—although in some cases it might be preferable to construct it of earthenware or glazed and baked clay. The conduit being thus prepared in sections of a convenient length for handling, the said sections are put together and laid in the bottom of a trench, which has been previously excavated to a suitable depth below the surface of the earth. The top or cover *a* of the conduit is not placed upon it until after the conductors have been secured therein in the manner hereinafter described.

The conductors are composed of wires, preferably of copper or iron, and are insulated by means of one or more coatings of india-rubber, gutta-percha, hemp, manila, cotton, or other suitable non-conducting and water-proof material. The separate conductors are threaded through transverse supports consisting of plates B B, placed at convenient distances apart, and perforated with holes *b b* for the reception of the wires, as seen in Figs. 1 and 3. I prefer to arrange the conductors in pairs, each pair forming a metallic circuit or endless loop for telegraphic or telephonic purposes, and in this case each pair of conductors is run through a single series of holes in the transverse supports. Conductors thus arranged are shown at C C in Fig. 3, and also in Fig. 5. The object of this mode of construction is to counteract the effects of induction from neighboring wires, which, in the case of telephone-lines, gives rise to extraneous noises, which tend to confuse the articulate sounds transmitted by the instruments. The inductive effect of other wires upon a circuit composed of a direct and a return wire in close proximity to each other throughout their length tends to counteract itself, and, in fact, will absolutely counteract itself, providing the disturbing influence is equidistant from the direct and the return wire. By twisting the parallel conductors of each pair, or laying them round each other in a long spiral, as shown in Fig. 5, the average or mean distance of each conductor from all the other wires in the group becomes precisely equal, and thus the inductive effects of the other wires are neutralized.

When the conductors are to be employed for ordinary telegraphic purposes, and the distances are not too great, the inductive effect of the different wires upon each other will not be sufficient to cause any serious interference, and in such cases the wires may be run singly through the supports and parallel to each other, as shown at C′ in Fig. 3.

In most cases the route of the conduit containing the wires will be along and beneath the principal streets and roadways of cities and towns, and it is therefore very desirable that the operation of laying the wires should occupy as little time as possible, so that the ordinary traffic of the street will not be obstructed by the trenches or other excavations. I therefore prefer to arrange the conductors in their supports before placing the latter in the conduit at the bottom of the trench. A group of conductors of great length may thus be prepared ready for laying before leaving the manufactory. When the trench has been opened, these may be conveyed to the place where they are designed to be laid, and deposited in the conduit, previously prepared to receive them, with very little loss of time. Fig. 3 shows a portion of a partially-completed group of conductors prepared in this manner. The conductors having been threaded through the proper apertures in the supports, the latter are arranged at suitable distances apart along the conductors, and secured to the latter by wedges or clamps, which may be either of a temporary or a permanent character, according to circumstances. The group of conductors thus arranged in connection with the transverse supports forms, as it were, a skeleton cable, which may be wound upon a large reel, D, as shown in Fig. 4, and thus conveniently transported to the place where it is to be laid. The trench having been opened and the conduit A placed upon the bottom thereof, the reel D is rolled along the surface of the ground, and the cable unwinding therefrom is deposited in the conduit, with the supports B B in their places at proper intervals. When a convenient length has thus been laid the conductors are drawn tight, and the supports B B fixed in their places in the conduit, preferably by means of wooden wedges. The cover a is then placed upon the conduit, over the wires, and secured by screws or other suitable means, after which the earth is replaced in the trench.

In order to still further guard against the effects of induction between the different conductors I face the supports B B with a metallic plate, B′, (best seen in Fig. 2,) which touches the outside of the insulating covering of each conductor of the group, and is preferably in electrical connection with the earth. In lieu of this the supports B B may be composed entirely of conducting material, if preferable.

In some cases I prefer to insert short metallic tubes in the apertures through which the wires pass, as shown in Fig. 6 at E E, these being in electrical connection with each other and with the earth through the plate B′, as hereinbefore described. By this means a greater length of the outside of the insulating-coating of each wire is brought into electrical communication with the plate and with the earth.

In placing the wires in the supports in the manner hereinbefore described, it will, in many instances, be found advantageous to change the arrangement of the conductors in the supports with reference to each other, at successive points—say one hundred feet apart, more or less—so that each conductor, instead of being parallel to the others throughout, will occupy various different positions with reference to them at different places. This will also tend to reduce the amount of interference between the different circuits.

I make no claim herein to this organization or mode of grouping circuits in order to reduce or eliminate the effects of induction, as I intend to embrace it in a subsequent application.

I am aware that insulated conductors have heretofore been laid within a conduit in parallel groups, with metallic supports intervening between the several groups. My organization differs from this in that each individual conductor is separated by the intervening metallic supports from all the other parallel conductors in the conduit, which result is effected by the use of conducting transverse supports having perforations, through which the conductors are made to pass.

I claim as my invention—

1. The hereinbefore-described method of preparing multiple telegraph-lines for laying, which consists in threading insulated conductors through perforated transverse supports, securing said supports to the conductors at suitable distances from each other, and winding the skeleton cable thus formed upon a reel.

2. The combination, substantially as hereinbefore set forth, of a trunk or conduit, insulated electric conductors extended within said conduit, and perforated transverse conducting-partitions placed within said conduit, and constructed substantially as described, whereby each individual conductor is supported and separated from all the neighboring conductors.

In testimony whereof I have hereunto subscribed my name this 23d day of September, A. D. 1880.

CHARLES H. SEWALL.

Witnesses:
GEORGE F. SMITH,
GEORGE B. PARMER.